United States Patent [19]
Yumoto et al.

[11] Patent Number: 5,895,616
[45] Date of Patent: Apr. 20, 1999

[54] METHOD OF PREFORMING FRICTION MATERIAL

[75] Inventors: Takeo Yumoto; Nobuyuki Iwatate; Naozumi Kawanishi; Yuji Watanabe, all of Saitama, Japan

[73] Assignee: Akebono Brake Industry Co., Ltd., Tokyo, Japan

[21] Appl. No.: 08/668,082

[22] Filed: Jun. 21, 1996

[30] Foreign Application Priority Data

Jun. 23, 1995 [JP] Japan ............... 7-158106

[51] Int. Cl.$^6$ ............................................. B29C 31/04
[52] U.S. Cl. ............................ 264/69; 264/122; 51/298; 51/308; 51/309
[58] Field of Search ............................ 264/109, 122, 264/71, 72, 69; 425/356, 421, 431, 419; 51/298, 307, 308, 309

[56] References Cited

U.S. PATENT DOCUMENTS

| | | |
|---|---|---|
| 2,573,141 | 10/1951 | Heinrich . |
| 3,746,589 | 7/1973 | Reinke ............... 264/69 |
| 4,138,463 | 2/1979 | Moneghan ............... 264/122 |
| 5,061,171 | 10/1991 | Akatsu . |
| 5,089,032 | 2/1992 | Moran ............... 51/298 |
| 5,224,970 | 7/1993 | Harakawa et al. ............... 51/298 |

FOREIGN PATENT DOCUMENTS

| | | |
|---|---|---|
| 2 646 375 | 11/1990 | France . |
| 61-286099 | 12/1986 | Japan . |
| 61-286100 | 12/1986 | Japan . |
| 2-51719 | 11/1990 | Japan . |
| 3-6878 | 1/1991 | Japan . |
| WO88/02685 | 4/1988 | WIPO . |

OTHER PUBLICATIONS

Copy of Search Report dated Jul. 27, 1998 for French Patent Application No. 9607818000.

*Primary Examiner*—Jan H. Silbaugh
*Assistant Examiner*—Kenneth M. Jones
*Attorney, Agent, or Firm*—Finnegan, Henderson, Farabow, Garrett & Dunner, L.L.P.

[57] ABSTRACT

A friction material matrix 2 consisting of a mixture of a fibrous base material, a binder, and various fillers is introduced into a molding die 3. Rod members 5 are inserted into the molding die 3 from above. The rod members 5 are vertically actuated while a stroke of the actuation of the rod members 5 is gradually reduced. The friction material matrix 2 is compressed until its volume becomes 50 to 60 vol. % of the initially introduced friction material matrix 2. Then, a bottom plate 4 is raised to compress the friction base matrix 2, so that the friction base matrix 2 is preformed.

6 Claims, 1 Drawing Sheet

METHOD OF PREFORMING FRICTION MATERIAL

BACKGROUND OF THE INVENTION

1. Field of the Invention

The present invention relates to a method of preforming a friction material used as, for example, a disk brake friction pad for use in an automobile.

2. Related Art

For example, a disk brake friction pad for use in an automobile is manufactured by the steps of introducing a friction material matrix which consists of a mixture of a fibrous base material made from, e.g., metallic, inorganic, or organic fibers, a binder made from a thermosetting resin powder, and various fillers, e.g., a friction adjustor and a lubricant, into a molding die; stamping the friction material matrix at room temperature; preforming the stamped friction material matrix; transferring the thus formed preform to a thermoforming die having a back plate set thereto; and heating the thermoforming die under pressure (hereinafter referred to as thermoforming).

In the above described manufacturing processes, the friction material matrix introduced into the molding die is leveled before being preformed. For example, Japanese Patent Publn. No. Hei-2(1990)-51719 discloses a method of forming a two-layer disk brake friction pad. Specifically, the disk brake friction pad comprises a brake lining layer made from semi-metallic material, and a heat insulating layer which is made from material with plenty of heat insulating properties and has a projecting boss to be jointed into a dovetailed hole formed in a back plate. The method is characterized by comprising the steps of introducing material for use as the heat insulating layer into a molding die, forming the boss by stamping the heat insulating layer by lowering a boss-stamping rod, leveling the top of the heat insulating layer, introducing a powder and granular material, such as, a semi-metallic material on the flat top of the heat insulating layer, further leveling top of the semi-metallic material, and ramming the semi-metallic material and the heat-insulating layer by lowering a pressing ram into the molding die. Further, Japanese Patent Publn. No. Hei-3 (1991)-6878 discloses a flattening apparatus preferably for use in the above described flattening operation.

As a result of the surface of the friction material matrix being leveled through the flattening operation, the thickness of the friction material matrix in the molding die becomes even. The distribution of pressure of the pressing ram also becomes even, which improves the moldability of the friction material matrix.

The friction material matrix consists of a mixture of a fibrous base material, a binder, and various fillers, and these materials are solid. When the friction material matrix is introduced into the molding die, a plenty of air is mixedly trapped in the friction material matrix. Some of the air escapes through voids between the interior wall of the molding die and the friction material matrix associated with a compressing operation. However, much of the air still remains in the preform. If the preform containing the residual air is thermally formed, the residual air expands, so that holes are formed in a resultant molding. Eventually, cracks or bulges are produced in the molding, that is, a disk brake friction pad.

The previously described flattening operation is only intended to level the upper surface of the friction material matrix. By means of this flatting operation, the adhesion between the two materials contained in the two-layer disk brake friction pad, as disclosed in Japanese Patent Publn. No. Hei-2(1990)-51719, and the adhesion of a contact surface between the friction material matrix and the pressing ram are improved. However, it is impossible to eliminate the air still remaining in the friction material matrix by the flattening operation.

In view of the friction effect and mechanical strength of the disk brake friction pad, it is desirable that the fibrous base material, the binder, and the various fillers should become united to each other, specifically, fibers should become closely interlocked together, and they should become integrally united together while the fillers run deep into the fibrous base material, in addition to the even distribution of the fibrous base material, the binder, and the fillers within the molding. The friction material matrix is prepared by formulating predetermined amounts of solid materials, that is, the fibrous base material, the binder, and the fillers, and by simply kneading them with each other. As a result, the materials become locally uneven and less united together.

However, it is impossible to make the materials united together as well as to make the friction material matrix homogenous to a much greater extent by use of the previously described flattening operation.

SUMMARY OF THE INVENTION

An object of the present invention is to provide a friction material which has superior friction effect and mechanical strength and prevents cracks and bulges from being produced in a molding when the friction material is thermally formed.

The above described object is achieved by a method of preforming a friction material comprising the steps of introducing a friction material matrix consisting of a mixture of a fibrous base material, a binder, and various fillers into a molding die, compressing the friction material matrix with a rod member, and compression-molding the friction material matrix.

As a result of the compression of the friction material matrix with the rod member in the preforming operation, the air mixedly trapped in the friction material matrix escapes, which in turn prevents cracks and bulges from being produced in a molding when the friction material matrix is thermally formed.

The compression of the friction material matrix also makes the materials thereof, that is, the fibrous base material, the binder, and the fillers, more homogeneous than they were prepared. As a result of those materials being interlocked, the materials become united together, which in turn results in improved friction effect and mechanical strength of a molding due to thermoforming.

Those advantageous results become more effective, particularly, by compressing the friction material matrix in order from the bottom to top of the molding die, and by compressing the friction material matrix until its volume becomes 50 to 60 vol. % of the initially introduced friction material matrix.

DESCRIPTION OF THE PREFERRED EMBODIMENTS

With reference to the accompanying drawings, a method of preforming a friction material according to the present invention will now be described in detail hereinbelow.

FIGS. 1 through 4 are schematic representations arranged in sequential order of a process of preforming a friction material for explaining a friction material forming method according to the present invention.

Figure 1:
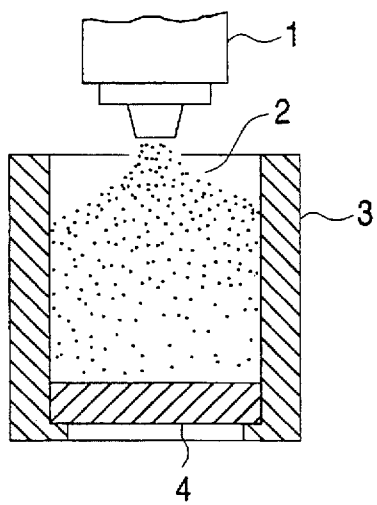
FIG. 1 is a schematic representation for explaining a method of preforming a friction material according to the present invention, which shows the introduction of a friction material matrix.

As shown in FIG. 1, a predetermined amount of friction material matrix 2 is first introduced into a molding die 3 from a material introducing unit 1.

The friction material matrix 2 is not limited to any particular substance. As with a conventional friction material matrix, the friction material matrix 2 is prepared by formulating predetermined amounts of fibrous base material, binder, and various fillers, and by stirring them so that they will be homogeneously mixed. As will be exemplarily described hereunder, conventional substances widely used as a friction material matrix can be also used as the above described materials.

For example, metallic fibers consisting of steel, copper, or brass, carbon fibers, glass fibers, inorganic fibers such as ceramic fibers consisting of potassium titanate, and organic fibers such as aramid fibers and flame-resistance acrylic fibers are mentioned as the fibrous base material. These materials are individually used or may be used in combinations.

The binder is a powder consisting of thermosetting resin, for example, a resin powder such as phenolic resin, epoxy resin, or melamine resin.

For example, an inorganic friction adjustor consisting of metallic oxide particles such as alumina, silica, or zirconia, an organic friction adjustor consisting of cashew dust or rubber dust, a lubricant consisting of graphite or molybdenum disulfide, a metallic powder such as copper or brass, materials chiefly intended to improve the mechanical strength of a product such as barium sulfate and calcium carbonate, materials chiefly intended to reduce noise such as vermiculite and mica, and an incombustible material such as antimony trichloride can be mentioned as the filler.

The molding die 3 has its bottom opened, and the bottom is closed by a bottom plate 4 which is independent of the molding die 3.

Figure 2:
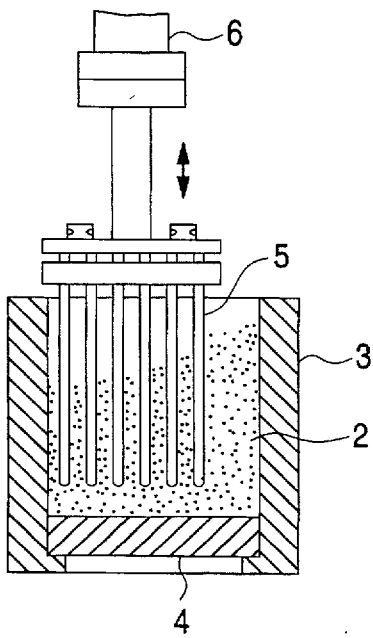
FIG. 2 is a schematic representation for explaining the method of preforming a friction material according to the present invention, which shows the compression of the friction material matrix (the beginning of the compressing operation)
Figure 3:
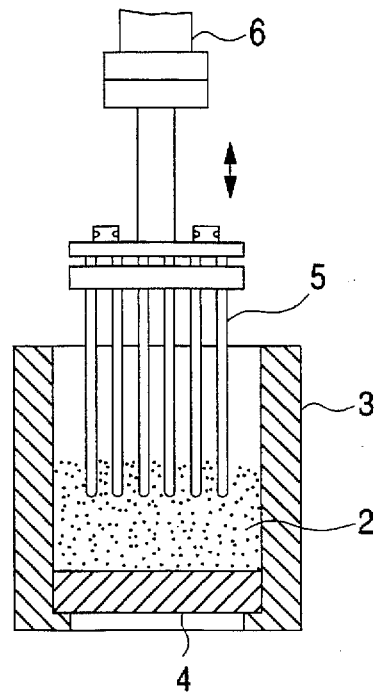
FIG. 3 is a schematic representation for explaining the method of preforming a friction material according to the present invention, which shows the compression of the friction material matrix (the end of the compressing operation)

As illustrated in FIGS. 2 and 3, rod members 5 are inserted into the molding die 3 from above after the friction material matrix 2 has been introduced into the molding die. Then, the friction material matrix 2 is compressed.

The rod members 5 are metal rods having their tips machined into, for example, a semi-spherical shape having a diameter of 3–4 mm. As shown in the drawings, the plurality of rod members 5 are attached to a robot 6 for vertically actuating the rod members 5, in such a way as to be spaced at predetermined pitches, e.g., a pitch of 15 mm, apart from each other.

The friction material matrix 2 is compressed in order from its deep inside to surface, that is, the bottom plate 4 of the molding die 3 to upper part of the molding die 3. To this end, the rod members 5 are lowered to such an extent that their tip ends arrive at the close vicinity of the bottom plate 4 of the molding die 3. Next, the robot 6 is moved so as to travel over, in parallel with, the overall surface of the bottom plate 4 while the rod members 5 are vertically actuated at the same stroke. The robot 6 is then moved so as to travel over, in parallel with, the overall surface of the bottom plate 4 while the rod members 5 are vertically actuated at smaller strokes. As a result of the horizontal movement of the rod members 5 over the entire surface of the bottom plate 4 while the stroke of the actuation of the rod members is gradually reduced, the friction material matrix 2 can be compressed from its deep inside to surface. The number of times the friction material matrix is compressed for each stroke is not particularly limited. However, the compression is carried out about five to seven times.

The operation of the rod members 5 is controlled by a control unit (not shown) connected to the robot 6. The robot 6 makes it possible to set a compression pattern in a various manner and to cope with a variety of kinds of friction material matrix by changing the speed of the vertical actuation of the rod members 5 (i.e., a compressing force), the number of times the friction material matrix is compressed, the extent of the stroke, or the speed of the horizontal movement of the rod members corresponding to the kind of the friction material matrix 2 and a molded product.

As a result of the compressing operation, the air mixedly trapped in the friction material matrix 2 escapes, and the materials forming the friction material matrix 2 are made homogeneous. Further, the materials become closely interlocked.

It is desirable to compress the friction material matrix 2 until its volume is reduced to 50 to 60% of the initially introduced friction material matrix 2. If the volume of the friction material matrix is not reduced to that level, the escape of the air mixedly trapped in the friction material matrix 2 and the interlocking of the material become insufficient. As a result, the effect of the present invention will not be achieved. On the other hand, if the friction material matrix 2 is compressed to less than the above described level, any additional effect will not be obtained, which simply adds to cost.

The surface of the friction material matrix 2 is leveled to a certain extent as a result of the compressing action (FIG. 3). The friction material matrix may be subjected to a flattening operation similar to the conventional flattening operation in order to level its surface, as required.

Figure 4:
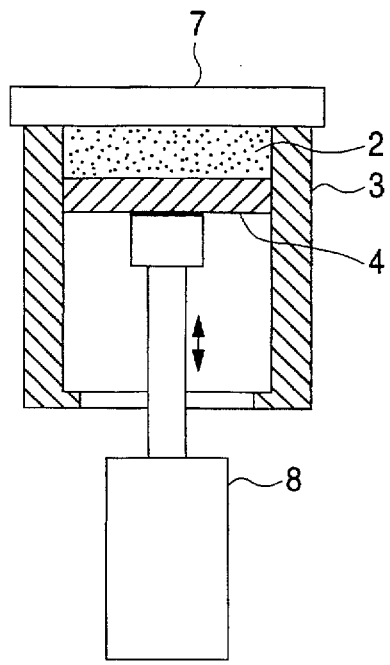
FIG. 4 is a schematic representation for explaining the method of preforming a friction material according to the present invention, which shows a compressed state of the friction material matrix as a result of the compressing operation.

As shown in FIG. 4, after the completion of the compressing operation, the rod members 5 are removed from the molding die 3. While a stopper plate 7 is placed on the molding die 3, the bottom plate 4 is upwardly pressed against the stopper plate 7 by a cylinder 8, whereby the friction material matrix 2 is compressed. The preforming operation is now completed.

At this time, much of the air mixedly trapped in the friction material matrix 2 has escaped as a result of the compressing operation. However, a considerable amount of air still remains in the friction material matrix 2, and hence it is desirable to ram the friction material matrix 2 with the cylinder 8 several times so as to discharge as much residual air as possible.

A series of the previously described preforming operations are carried out at room temperature.

The thus preformed friction material matrix 2 is removed from the molding die 3, and it is then thermally formed according to conventional practices. A final product is now produced.

The thus obtained final product undergoes neither cracks nor bulges resulting from expansion of air which arises during the course of the thermoforming operation, because the air mixedly trapped in the friction material matrix has escaped as a result of the compression of the friction material matrix carried out using the rod members during the preforming operation. The solid materials forming the friction material matrix, that is, the fibrous base material, the binder, and various fillers, are made more homogeneous than they were prepared. Further, the materials are interlocked together and become united to each other more tightly. As a result, the final product has superior friction effect and mechanical strength.

As has been described above, according to the present invention, the air mixedly trapped in the friction material matrix escapes as a result of the compression of the friction material matrix using the rod members during the preforming operation. Accordingly, a molding is prevented from undergoing cracks or bulges during the course of being thermally formed. Therefore, improved product yield is achieved.

Moreover, as a result of the compressing operation, the fibrous base material, the binder, and various fillers forming the friction material matrix are made more homogeneous than they were prepared. The interlocking of these materials results in the materials becoming united to each other. Consequently, the friction effect and mechanical strength of a molding due to thermoforming, which leads to high-quality products.

What is claimed is:

1. A method of preforming a friction material comprising the steps of:

introducing a friction material matrix consisting of a mixture of a fibrous base material, a binder, and various filters into a molding die;

tamping the friction material matrix by a series of reciprocating strokes of at least one rod member which tamps only a portion of said friction matrix material during each stroke, said portion being less than the entire volume of said friction matrix material;

wherein the friction material is progressively tamped between one end of the molding die and the opposite end of the molding die using the at least one rod member;

wherein said at least one rod member vertically reciprocates in strokes of decreasing length as tamping proceeds; and compression-molding the friction material matrix.

2. The method of preforming a friction material as defined in claim 1, wherein the friction material matrix is tamped with the rod member until the volume of said tamped friction material matrix becomes 50 to 60 vol. % of the initially introduced friction material matrix.

3. The method of preforming a friction material as defined in claim 1, wherein said rod member horizontally moves across the friction material matrix so as to ultimately tamp the entire volume of friction material matrix.

4. The method of preforming a friction material as defined in claim 1, wherein the friction material matrix is tamped with a plurality of rod members simultaneously.

5. The method of preforming a friction material as defined in claim 4, wherein each of said rod members vertically reciprocates in strokes of decreasing length.

6. The method of preforming a friction material as defined in claim 5, wherein said rod members horizontally move across the friction material matrix so as to ultimately tamp the entire volume of friction material matrix.

* * * * *

UNITED STATES PATENT AND TRADEMARK OFFICE
CERTIFICATE OF CORRECTION

PATENT NO. : 5,895,616
DATED : April 20, 1999
INVENTOR(S) : Takeo YUMOTO et al.

It is certified that error appears in the above-identified patent and that said Letters Patent is hereby corrected as shown below:

Claim 1, Column 6, line 6, "filters" should read --fillers--.

Signed and Sealed this

Ninth Day of November, 1999

Attest:

Attesting Officer

Q. TODD DICKINSON

Acting Commissioner of Patents and Trademarks